United States Patent [19]
Honbu et al.

[11] 4,058,755
[45] Nov. 15, 1977

[54] KRAMER SYSTEM UTILIZING A COMMUTATORLESS MOTOR

[75] Inventors: Mitsuyuki Honbu; Sanshiro Obara, both of Hitachi; Takamasa Hori, Tohkai, all of Japan

[73] Assignee: Hitachi, Ltd., Japan

[21] Appl. No.: 650,767

[22] Filed: Jan. 20, 1976

[30] Foreign Application Priority Data

Jan. 20, 1975 Japan .................................. 50-7804

[51] Int. Cl.² ............................................. H02P 1/54
[52] U.S. Cl. ..................................... 318/47; 318/197; 318/241; 318/439; 318/137
[58] Field of Search .................................. 318/44–47, 318/197, 213, 237, 241, 308, 327, 332, 137, 439

[56] References Cited
U.S. PATENT DOCUMENTS

| 2,061,983 | 11/1936 | Rossman | 318/47 |
| 3,515,969 | 6/1970 | Magnuson et al. | 318/237 |
| 3,686,548 | 8/1972 | Onoda et al. | 318/197 |
| 3,735,225 | 5/1973 | Raatz | 318/332 |

Primary Examiner—Robert K. Schaefer
Assistant Examiner—Michael K. Mutter
Attorney, Agent, or Firm—Craig & Antonelli

[57] ABSTRACT

A speed control system for an induction motor controlled by a converting arrangement coupled with a commutatorless motor which operates without commutation failure notwithstanding wide variations in the speed of the commutatorless motor. The speed control system includes an arrangement for maintaining the value of a direct current signal of the converting arrangement less than the maximum current value for ensuring proper operation of the converting arrangement.

9 Claims, 3 Drawing Figures

KRAMER SYSTEM UTILIZING A COMMUTATORLESS MOTOR

BACKGROUND OF THE INVENTION

1. Field of the Invention

The present invention is directed to a speed control system for an induction motor wherein control is effected in accordance with the Krämer system utilizing a commutatorless motor.

2. Description of the Prior Art

The speed control system of an induction motor controlled by the so-called "Krämer" system has an inverter connected with a commutatorless motor. That is, the speed control of the induction motor is usually effected in that a secondary winding output of the induction motor is rectified by a rectifier, converted to alternating current by a thyristor frequency converter, and the alternating current is supplied a synchronous motor. This synchronous motor is directly connected with the induction motor by a mechanical axis. In such a system, the speed of the induction motor is controlled by varying the advance angle to turn on the thyristors of said frequency converter with this speed control system being generally called the Krämer system.

In commutatorless Krämer speed control systems, the most important factor to ensure proper operation is to turn off the thyristors of the frequency converter without failure of commutation. In order to ensure turn off of the thyristors of the converter, the input direct current Ic of the thyristor converter must be less than a maximum current Icmax which is the maximum current permissible to ensure proper turn off of the thyristors. Another factor is that the input current Ic must be larger than load current $I_L$ with the currents Icmax and $I_L$ being varied according to the speed N of the Krämer system.

When the speed of the Krämer system changes suddenly, that is, at large acceleration or deceleration, the input current Ic becomes greater than Icmax; Ic > Icmax > $I_L$ such that the above-noted requirements are not met proper turn off of the thyristors of the converter is not ensured. Accordingly, the speed of the Krämer system must, therefore, be changed slowly or maintained within a small speed range.

SUMMARY OF THE INVENTION

An object of the present invention is to provide a speed control system for an induction motor which overcomes the above-noted disadvantages of the general Krämer system.

Another object of the present invention is to provide a speed control system for an induction motor which permits sudden variation of speed or over a wide range.

A further object of the present invention is to provide a speed control system which ensures that the input current Ic of the frequency converter is larger than the load current $I_L$ but less than the current Icmax.

These and other objects, features and advantages of the present invention will become more apparent from the following description when taken in connection with the accompanying drawings, which show, for purposes of illustration only, several embodiments in accordance with the present invention, and wherein.

DESCRIPTION OF THE PREFERRED EMBODIMENTS

Figure 1:
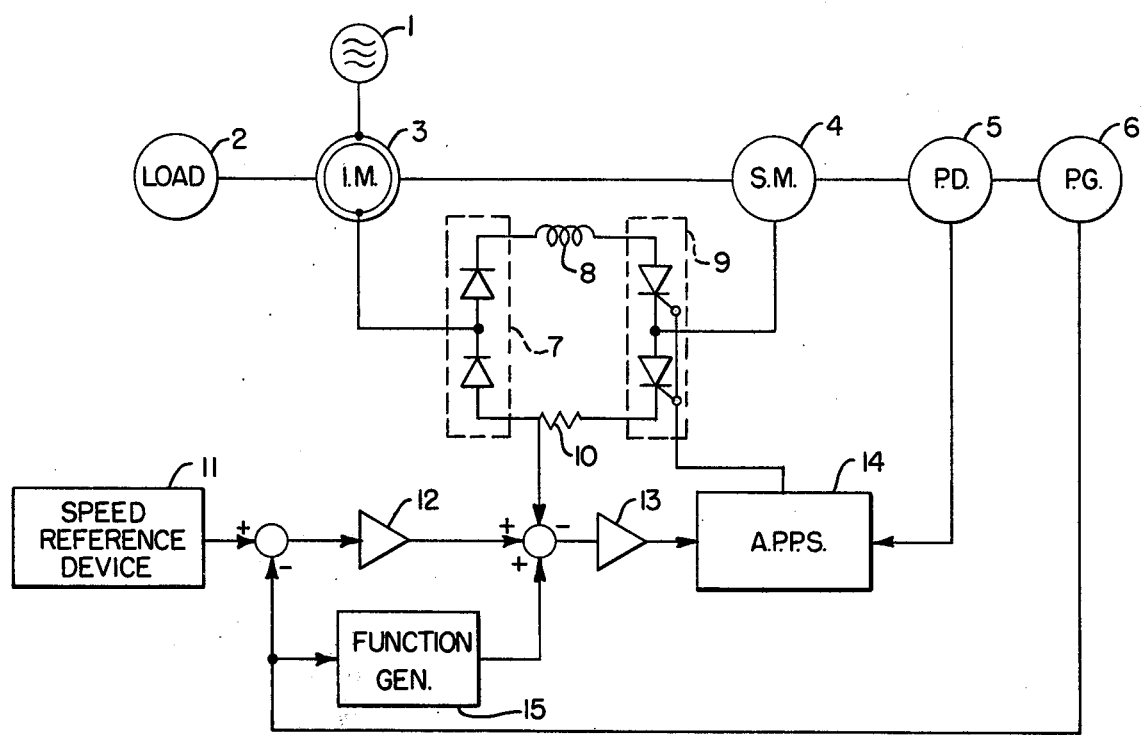
FIG. 1 is a schematic diagram of a speed control system according to an embodiment of the present invention.

Referring now to the drawings wherein like reference numerals are utilized to designate like parts throughout the several views, there is shown in FIG. 1 a speed control system for an induction motor wherein an alternating power source 1 supplies power to an induction motor 3. An output of a secondary winding of the induction motor 3 is supplied to a diode rectifier 7 with the direct current from the rectifier 7 being supplied to a thyristor frequency converter 9 through a direct current reactor 8. The thyristor frequency converter 9 is controlled by an automatic pulse phase shifter 14 and the output of the converter 9 is supplied to synchronous motor 4. A position detector 5 detects a magnetic pole position of the synchronous motor 4 and supplies a pulse to the automatic pulse phase shifter 14. A pilot generator 6 detects a rotating speed of the synchronous motor 4. A load 2 is coupled to the induction motor with the induction motor 3, the synchronous motor 4, the position detector 5 and the pilot generator 6 being mechanically connected to each other.

A speed reference device 11 sets a desired speed for the induction motor 3 and a signal indicative of the deviation between the speed reference signal from the device 11 and an actual speed signal from the pilot generator 6 is supplied to an operational amplifier 12, reference numeral 13 also being an operational amplifier.

The above-mentioned system is a conventional Kramer system and in accordance with the present invention, the Krämer system is modified by utilizing a function generator 15.

The Krämer system usually operates when the output voltage $SE_2$, of the diode rectifier 7 and the input voltage Et cos γ of the thyristor frequency converter 9 is well-balanced. From this relation, the following equation can be obtained:

$$SE_2 = Et \cos \gamma \qquad (1)$$

S = slip of the induction motor 3
$E_2$ = secondary winding output voltage of the induction motor 3 when S = 1
Et = counter electromotive force
γ = advance angle of the converter 9

Then, generally a relation among the advance angle u and a turn-off reactance X of the motor 4 becomes as follows:

$$\cos(\gamma - u) = \cos \gamma + \frac{2 \times I_c}{\sqrt{2} \; Et} \qquad (2)$$

Ic = current flowing into the converter 9. The counter electromotive force Et of the motor 4 is in proportion to a revolutional speed of the motor 4 and the following equation is obtained:

$$Et = KN \qquad (3)$$

K = a proportional constant

A revolutional speed N of the induction motor 3 which is equal to the speed of the synchronous motor 4 is as follows:

$$N = (1 - S)N_C \qquad (4)$$

$N_C$ = synchronous revolutional speed of the induction motor 3

If the margin angle $(\gamma - u)$ is equal to the minimum margin angle $\delta$, the current $I_c$ flowing into the converter 9 becomes its maximum value Icmax, so that the equation (2) is represented as follows:

$$\cos \delta = \cos \gamma + \frac{\sqrt{2} \times I_c \text{max}}{Et} \qquad (5)$$

Figure 2:
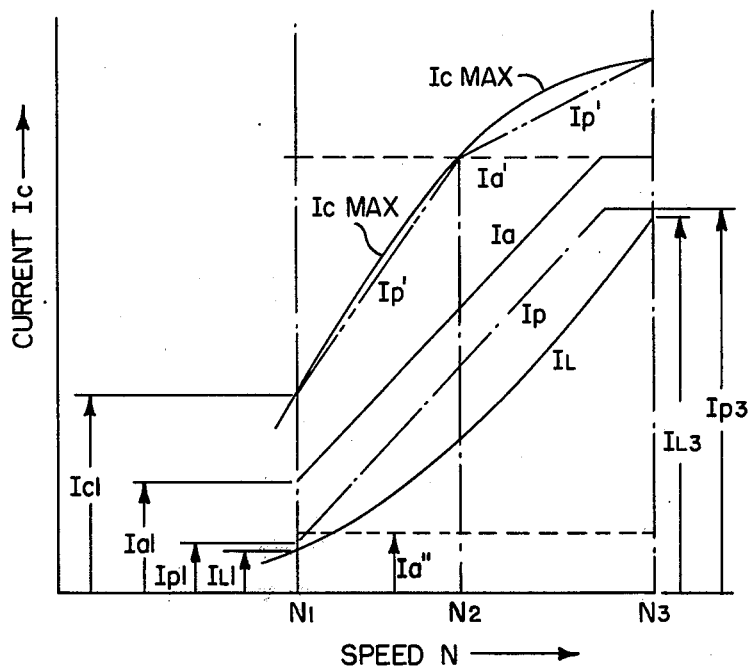
FIG. 2 shows a characteristic curve of the Kramer system in accordance with the invention.

A curve of Icmax with respect to the speed N as shown in FIG. 2 is obtained from the above equations (1), (3), (4) and (5).

Icmax is the maximum direct current permissible to ensure proper turn off of the thyristor of the frequency converter 9 which flows through the direct current reactor 8. When the current Ic exceeds Icmax, the converter 9 fails to turn off. Therefore, the current Ic flowing into the converter 9 through the reactor 8 must be less than the current Icmax. The current Icmax varies according to the revolutional speed of the motor 4. On the other hand, the direct current $I_L$ of the motor 3 which is required by the load 2, such as a water pump or an air blower, varies in response to the speed of the motor 4, as shown in FIG. 2.

The current Ic must be larger the current $I_L$. Thus,

Icmax > Ic > $I_L$

From this condition, the speed control range becomes generally narrower than the range $N_1$ to $N_3$ of FIG. 2. Now in FIG. 2, when the motor 4 is driven at the speed $N_1$, and the speed reference of the speed reference device 11 varies suddenly and widely from $N_1$ to $N_3$, the deviation between the speed reference and the actual speed of the pilot generator 6 becomes large and is supplied to the operational amplifier 12. The operational amplifier 12 amplifies the deviation up to the limit value Ia'.

Although the actual speed of the motor is at $N_1$, the value of the direct current of the converter 9 rises to the value Ia which is larger than $Ic_1$ which is the maximum current at the speed $N_1$. Accordingly, the thyristor frequency converter fails to turn off. For this reason, the Krämer system generally has a narrow speed control range in order to avoid commutation failure. In FIG. 2, the actual current Ic must be maintained below the maximum current Icmax at any speed variation and the speed control was generally limited to the range from $N_2$ to $N_3$.

In accordance with the present invention, a function generator 15 is utilized together with the operational amplifier 12 which serves to generate a constant signal Ia'' as shown in FIG. 2. The function generator 15 generates an output signal Ip in proportion to the actual signal from the pilot generator 6. The current $(Ip + Ia'')$ which is larger than $I_L$ and less than Icmax is compared with the direct current detected by a current detector 10, and is supplied to the automatic pulse phase shifter 14 through the operational amplifier 13 in order to control the thyristor frequency converter 9.

At the speed $N_1$, the load requires the current $I_{L1}$ and the induction motor 3 begins to accelerate according to an accelerating current $(Ia_1 - I_{L1})$. Since the current $Ic_1$ is larger than $Ia_1$, the thyristor frequency converter does not fail to turn off. And then, according to the acceleration of the motor, the output signal Ip of the generator 15 rises to the limit value $Ip_3$.

The signal Ip from the function generator 15 and the signal Ia'' from the operational amplifier 12, that is to say, the current $(Ip + Ia'' = Ia)$ causes the induction motor 3 to accelerate. When the speed of the motor 3 goes up to $N_3$, the generator 15 generates the current $Ip_3$ and the output signal of the operational amplifier 12 is kept at the value $-(Ip_3 - I_{L3})$, and the induction motor is kept rotating at the speed of $N_3$. Thus, proper operation of the thyristor, frequency converter without commutation failure over a wide range of speed values at sudden accelerations of the induction motor 3 is ensured.

In the above-mentioned system, the output of the function generator 15 can be linearly approximated such as the line Ip' in FIG. 2 whereby the output of the operational amplifier is always negative. Therefore, maximum acceleration can be possible without commutation failure. Additionally, a cycloconverter may be utilized in the system replacing the diode rectifier 7, the reactor 8 and the thyristor converter 9.

Figure 3:
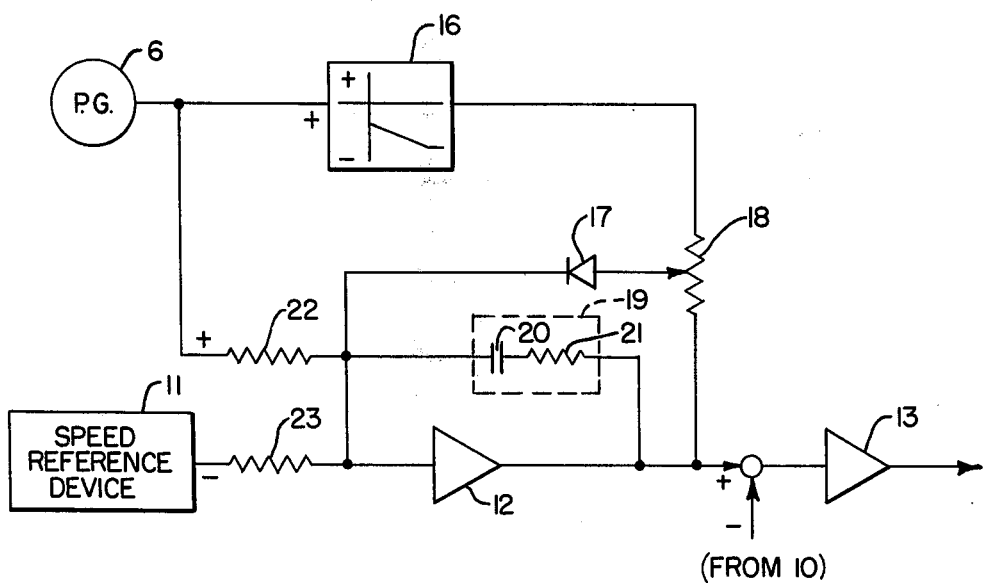
FIG. 3 illustrates a speed reference device for use with the circuit in FIG. 1.

Another embodiment of the present invention is shown in FIG. 3 which illustrates a portion of the circuit of FIG. 1. The operational amplifier 12 amplifies the output of the speed reference device 11. When the output of the pilot generator 6 is larger than the output of the speed reference device 11 (which is selected to be negative in FIG. 3), the output of the operational amplifier 12 is maintained at the value Ia limited by the circuit including a resistor 18 and a diode 17. As shown in FIG. 3, the circuit also includes resistors 21, 22 and 23, and capacitor 20 with capacitor 20 and resistor 21 forming unit 19 in the feedback path of the operational amplifier 12.

The value Ia varies corresponding to the output of a function generator 16 with the output of the generator 16 being varied in the manner of Ia in FIG. 2 according to the speed of pilot generator 6.

The induction motor in accordance with the present invention is utilizable as a variable speed motor over a wide speed range in applications such as a water pump or air blower drive.

While we have shown and described several embodiments in accordance with the present invention, it is understood that the same is not limited thereto but also contemplates numerous changes and modifications as would be known to those skilled in the art given the present disclosure of the invention, and we therefore do not wish to be limited to the details shown and described herein only schematically, but intend to cover all such changes and modifications.

What is claimed is:

1. A speed control system for an induction motor, comprising an induction motor having a winding providing an output, a load driven by the induction motor, a synchronous motor mechanically connected to the induction motor, converting means responsive to the output of the winding of the induction motor for providing a direct current signal and therefrom an alternating current signal for application to the synchronous motor, the converting means including thyristor means, a current signal generating means supplying a current signal to the gates of the thyristor means of the converting means in accordance with a desired speed value and the actual speed value of the synchronous motor, and function generator means for varying the current signal generated by the current signal generating means to maintain the value of the direct current signal of the converting means less than a maximum commutation current value and greater than a minimum load current value in accordance with the actual speed value of the synchronous motor.

2. A speed control system according to claim 1, wherein the current signal generating means includes deviation means for providing a deviation signal of the difference between the desired speed value and the actual speed value, and control means responsive to the deviation signal and an output of said function generator means for controlling the thyristor gates of the converting means.

3. A speed control system according to claim 1, wherein the current signal generating means includes deviation means for providing a deviation signal of the difference between the desired speed value and the actual speed value, and operation amplifier means for amplifying the deviation signal, said function generator means varying the limiting value of the output of the operational amplifier means in proportion to the actual speed value.

4. A speed control system according to claim 1, wherein the converting means includes rectifying means for rectifying the output of the winding of the induction motor to provide a direct current signal and a thyristor convertor means for converting the direct current signal into an alternating current for application to the synchronous motor.

5. A speed control system according to claim 4, wherein the output winding of the induction motor is a secondary winding.

6. A speed control system according to claim 1, wherein the converting means includes a cycloconverter.

7. A speed control system according to claim 2, further comprising means for supplying a desired speed reference value, means for detecting the actual speed of the synchronous motor and providing an actual speed value signal, and means for detecting a magnetic pole position of the synchronous motor, the control means also being responsive to the magnetic pole position detecting means for controlling the thyristor gates of the converting means.

8. A speed control system according to claim 7, including means for detecting the value of the current in the converter means and providing an output indicative thereof to the control means.

9. A speed control system according to claim 8, wherein the control means includes an operational amplifier means responsive to the output of the current detecting means, the deviation signal and an output of the function generator means for providing an amplified output signal, and an automatic pulse phase shifter means responsive to the magnetic pole detecting means and the output signal of the second operational amplifier means for controlling the gates of the thyristors of the converting means.

* * * * *